United States Patent [19]
Jee

[11] Patent Number: 5,900,882
[45] Date of Patent: May 4, 1999

[54] DETERMINING TEXTURE COORDINATES IN COMPUTER GRAPHICS

[75] Inventor: Suk Choon Jee, Santa Clara, Calif.

[73] Assignee: Samsung Electronics Co., Ltd., Seoul, Rep. of Korea

[21] Appl. No.: 08/751,187

[22] Filed: Nov. 15, 1996

[51] Int. Cl.$^6$ .................................................. G06T 11/40
[52] U.S. Cl. .......................................................... 345/430
[58] Field of Search ................................... 345/430, 429; 364/765, 736

[56] References Cited

U.S. PATENT DOCUMENTS

| | | | |
|---|---|---|---|
| 3,748,447 | 7/1973 | Hajicek et al. | 235/152 |
| 4,779,218 | 10/1988 | Jauch | 364/736 |
| 4,838,233 | 6/1989 | Knierim | 364/761 |
| 5,012,438 | 4/1991 | Yamaguchi | 364/765 |
| 5,594,846 | 1/1997 | Donvovan | 395/130 |
| 5,704,024 | 12/1997 | Voorhies et al. | 395/126 |

OTHER PUBLICATIONS

Segal, M. et al., "Fast Shadows and Lighting Effects Using Texture Mapping", *Computer Graphics*, 26, 2, Jul. 1992, pp. 249–252.

Foley, J.D. et al., "Computer Graphics: Principles and Practice" (Addison–Wesley Publishing Company, 2nd ed. in C, 1996), pp. 72–104.

Burger, P. et al., "Interactive Computer Graphics" (Addison–Wesley Publishing Company, 1989), pp. 76–110.

U.S. application No. 08/749,859, Sang–Gil Choi, filed Nov. 15, 1986.

Ferraro, Richard F., "Learn 3D Graphics Programming on the PC" (Addison–Wesley Developers Press 1996), pp. 353–415.

Foley, J.D. et al., "Computer Graphics: Principles and Practice" (Addison–Wesley Publishing Company, 2nd ed. in C, 1996), pp. 826–828.

Heckbert, P.S., "Survey of Texture Mapping", *IEEE Computer Graphics and Applications* (1986), pp. 56–67.

Williams, L., "Pyramidal Parametrics", *Proceeding of SIGGRAPH '83, Computer Graphics*, vol. 17, No. 3, Jul. 1983, pp. 1–11.

Knittel, G. et al., "Hardware for Superior Texture Performance", *Proceedings of 10th Eurographics Workshop on Graphics Hardware* (1995), pp. 33–40.

Ackermann, H., "Single Chip Hardware Support for Rasterization and Texture Mapping", *Proceedings of 10th Eurographics Workshop on Graphics Hardware* (1995), pp. 15–24.

Ferrari, D., "A Division Method Using a Parallel Multiplier", *IEEE Transactions on Electronic Computers* Apr. 1967, pp. 224–226.

*Primary Examiner*—Joseph H. Feild
*Assistant Examiner*—Alford W. Kindred
*Attorney, Agent, or Firm*—Skjerven, Morrill, MacPherson, Franklin & Friel; Michael Shenker

[57] ABSTRACT

The texture coordinates (u,v) of a point Q' are determined by: (1) determining the modified texture coordinates (u',v')=(u/z,v/z) by linear interpolation, where z is a world coordinate; (2) determining 1/z by linear interpolation; and (3) dividing (u',v') by 1/z. The division is replaced with multiplying (u',v') by the inverse of 1/z. The inverse is obtained using a lookup table (LUT). The LUT stores inverses of a few values. Linear interpolation is applied to the LUT output to increase the inverse value accuracy.

18 Claims, 3 Drawing Sheets

DETERMINING TEXTURE COORDINATES IN COMPUTER GRAPHICS

BACKGROUND OF THE INVENTION

The present invention relates to computers, and more particularly to determining texture coordinates in compute graphics.

Textures are used in computer graphics to make computer-generated images appear more realistic. A texture consists of a number of texture elements ("texels"). Each texel has a value corresponding to color, intensity, or some other image parameter. Texel values are used to modify the color, intensity, or other parameters of corresponding pixels in the computer image. See, for example, M. Segal et al., "Fast Shadows and Lighting Effects Using Texture Mapping", *Computer Graphics*, 26, 2, July 1992, pages 249–252, incorporated herein by reference.

In the computer, texels are identified by texture coordinates. Thus, finding a proper texel for a pixel involves determining the texel's texture coordinates. It is desirable to provide small and inexpensive circuits for determining the texture coordinates.

SUMMARY

The present invention provides circuits and methods for determining texture coordinates. In some embodiments, the circuits are small and inexpensive.

In some embodiments, besides the texture coordinates, a computer system uses world coordinates and screen coordinates. The world coordinates (x,y,z) are used to represent objects whose images are to be displayed on a computer screen. The screen coordinates (x',y') identify pixels on the screen. The world and screen coordinates are chosen so that a point having world coordinates (x,y,z) will be represented on the screen as a point with screen coordinates $x'=x/z$, $y'=y/z$.

The object surface to be represented on the screen is divided into polygons whose vertices have known world and texture coordinates. The screen coordinates (x',y') of the vertex images are set to (x/z, y/z) as described above. Then straight-line segments are drawn that interconnect the vertex images. Then individual points on different segments are connected by other straight-line segments to fill the polygons. See, for example, P. Burger and D. Gillies, "Interactive Computer Graphics" (1989), pages 76–110 incorporated herein by reference; J. D. Foley et al., "Computer Graphics: Principles and Practice" (1996), pages 72–104 incorporated herein by reference.

For each image point Q' having (possibly unknown) texture coordinates (u,v), let us introduce modified texture coordinates (u',v'): $u'=u/z$, $v'=v/z$, where z is the world coordinate of a point Q whose image is Q'. The images of the vertices have known texture coordinates (u,v), and therefore their modified texture coordinates (u',v') can be determined. Suppose a point Q' having screen coordinates (x',y') lies in a segment with end points $Q_1'$, $Q_2'$. Suppose the point $Q_1'$ has screen coordinates $(x_1',y_1')$ and modified texture coordinates $(u_1',v_1')$, and the point $Q_2'$ has screen coordinates $(x_2',y_2')$ and modified texture coordinates $(u_2',v_2')$. Then we find the modified texture coordinates (u',v') of Q' by linear interpolation:

$$(u',v')=(1-t)(u_1',v_1')+t(u_2',v_2')$$

where t is such that $$(x',y')=(1-t)(x_1',y_1')+t(x_2',y_2')$$

We find the texture coordinates of Q' by dividing (u',v') by 1/z where z is the world coordinate of a point Q whose image is Q'. 1/z is determined by linear interpolation.

In some embodiments, the division by 1/z is implemented as a multiplication by the inverse of 1/z (that is, multiplication by z (which may be unknown)). To speed up determining the inverse of 1/z, a lookup table is provided that stores the inverses of some values. To make the texture coordinates circuit smaller and less expensive, the lookup table is made small. Thus, the lookup table contains fairly few inverse values (32 inverse values in some embodiments). To improve accuracy, the inverse values not contained in the lookup table are determined by linear interpolation.

Once the texture coordinates are determined, the texel values are applied to the pixel to improve the image quality.

Other features and advantages of the invention are described below. The invention is defined by the appended claims.

DESCRIPTION OF PREFERRED EMBODIMENTS

Figure 1:
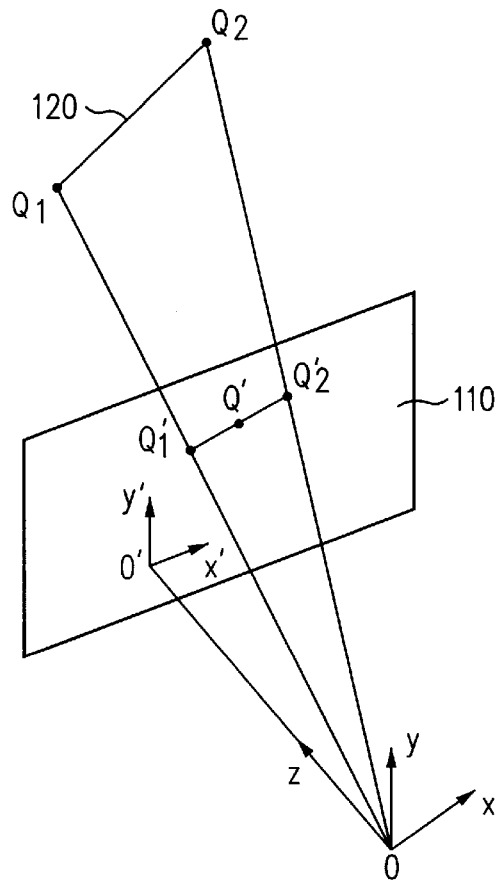
FIGS. 1 and 2 illustrate an object and its image on a screen.
Figure 2:
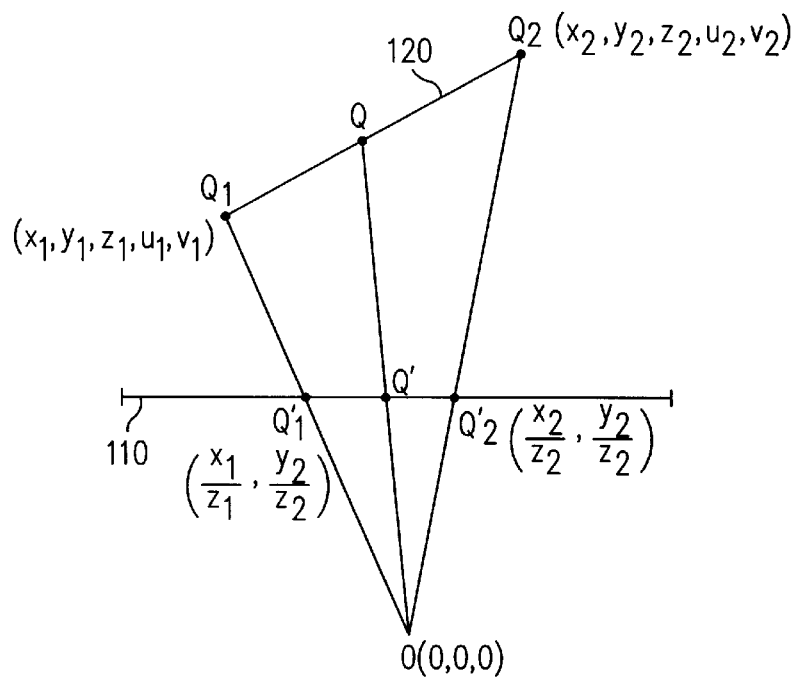

FIGS. 1 and 2 illustrate displaying an object on a computer screen 110. The viewpoint is shown at O. The object is to be displayed so that it would appear to the viewer to be at a position 120. The image on screen 110 is a perspective projection of the object (or part of the object) onto the screen 110 with the center of projection being at the viewpoint O.

The object includes a straight-line segment with end points $Q_1$, $Q_2$. The point $Q_1$ is to be displayed at point $Q_1'$ of screen 110. The point $Q_2$ is to be displayed at point $Q_2'$ of the screen. The segment interconnecting the points $Q_1$, $Q_2$ is to be displayed as a segment interconnecting the points $Q_1'$, $Q_2'$.

Object 120 is to be displayed with a texture. Points $Q_1$, $Q_2$ have known texture coordinates $(u_1,v_1)$ and $(u_2,v_2)$ respectively. Clearly, $Q_1'$ and $Q_2'$ have the same texture coordinates as $Q_1$ and $Q_2$ respectively. For any other point Q' in the segment $Q_1'Q_2'$, texture coordinates (u,v) are determined as described below.

The world coordinate system is chosen to be a Cartesian system xyz having the origin at the viewpoint O. The x and y axes are parallel to screen 110. The z axis is perpendicular to the screen. Screen 110 is located in the plane z=1. The screen has a Cartesian screen coordinate system x'y' with the origin at the intersection O' of the screen with the z axis. It can be shown that for any point Q on object 120, if the point Q has world coordinates (x,y,z) then the image of the point Q has screen coordinates $x'=x/z$, $y'=y/z$.

Denote the world coordinates of points $Q_1$ and $Q_2$ by $(x_1,y_1,z_1)$ and $(x_2,y_2,z_2)$ respectively. Then the point $Q_1'$ has screen coordinates $(x_1',y_1')=(x_1/z_1,y_1/z_1)$ and the point $Q_2'$ has screen coordinates $(x_2',y_2')=(x_2/z_2,y_2/z_2)$.

The screen coordinates of the pixels in the image $Q_1'Q_2'$ are determined using known scan conversion techniques.

Some scan conversion techniques are described in J. D. Foley et al., "Computer Graphics: Principles and Practice" (1996), pages 72–81 incorporated herein by reference. Given the screen coordinates (x',y') of the pixel Q', the texture coordinates (u,v) of Q' are generated by the circuitry of FIG. 3 as follows.

Circuit 310 receives the screen coordinates $x',y',x_1',y_1',x_2',y_2'$, and generates a line parameter t such that:

$$(x',y')=(1-t)(x_1',y_1')+t(x_2',y_2') \quad (1)$$

The equality (1) may be only approximate because, among other things, the pixels in the segment $Q_1'Q_2'$ are a discrete approximation of a straight-line segment. In some embodiments, t is generated as in the following pseudocode:
If $x_1' \neq x_2'$, then $t=(x'-x_1')/(x_2'-x_1')$ else $t=(y'-y_1')/(y_2'-y_1')$
Circuit 310 also generates the signal 1−t.
Circuit 320 receives t, 1−t and also receives the following signals:

$u_1'=u_1/z_1$,
$v_1'=v_2/z_1$,
$u_2'=u_2/z_2$,
$u_2'=v_2/z_2$.

Circuit 320 generates modified texture coordinates u',v' as follows:

$$(u',v')=(1-t)(u_1',v_1')+t(u_2',v_2') \quad (2)$$

Circuit 330 receives the signals t, 1−t, $1/z_1$, $1/z_2$ and generates a signal w' as follows:

$$w'=(1-t)(1/z_1)+t(1/z_2). \quad (3)$$

Circuit 340 receives u', v' and w' and generates the texture coordinates (u,v) using the formulas:

$u=u'/w'$, $v=v'/w'. \quad (4)$

Figure 4:
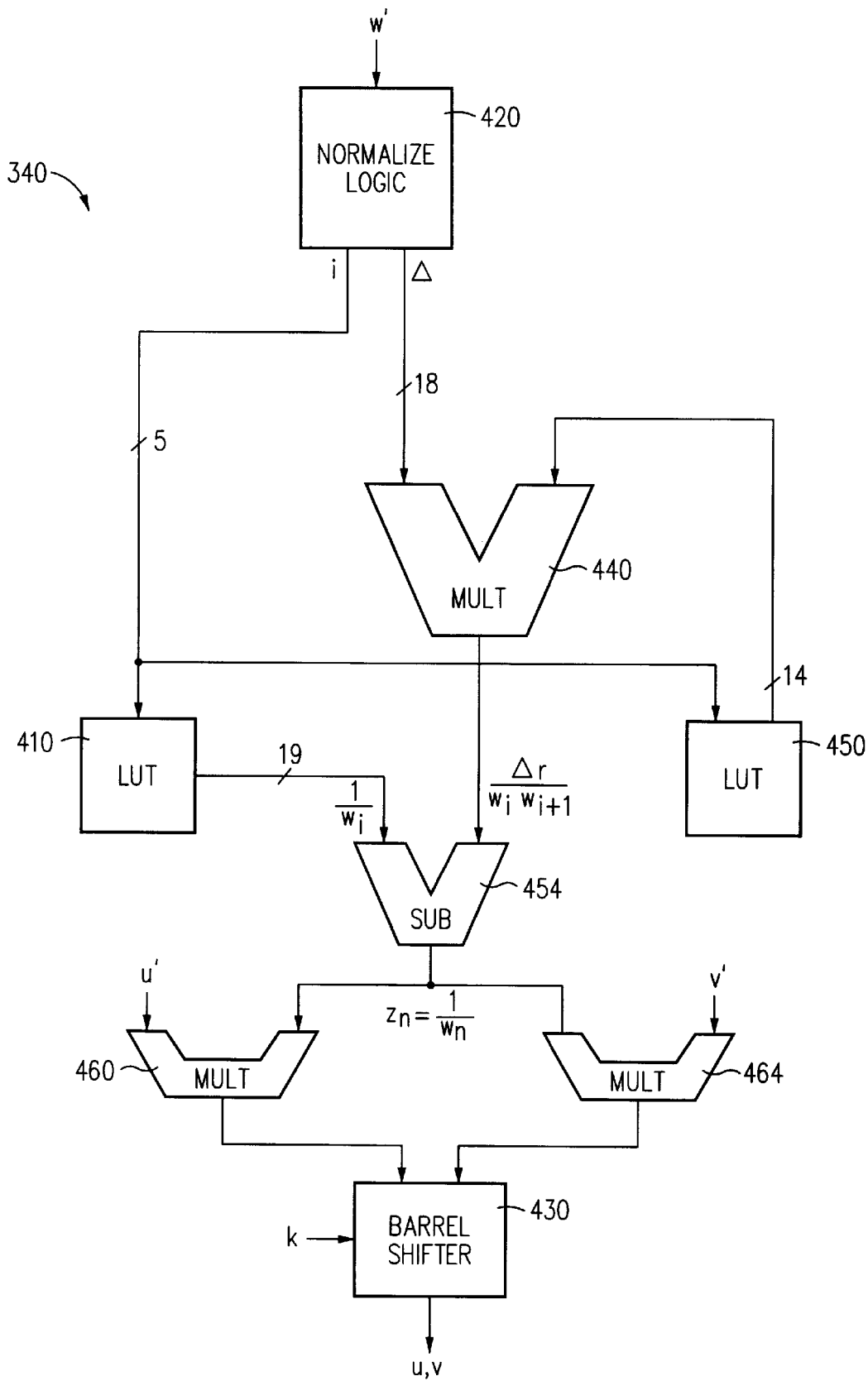
FIG. 4 is a detailed block diagram of a portion of the circuit of FIG. 3.

FIG. 4 is a detailed block diagram of circuit 340. To speed up the division by w', circuit 340 uses a lookup table (LUT) 410 to store the values 1/w'. To reduce the circuit cost and area, LUT 410 is made fairly small. In some embodiments, LUT 410 includes only 32 entries $1/w_i$. To determine 1/w more accurately, circuit 340 performs linear interpolation thus at least partially compensating for the small size of LUT 410.

LUT 410 stores the values of 1/w only for w in a predetermined interval, for example, in the interval [0.5, 1]. Normalize logic 420 normalizes the signal w' to produce a value in that interval, as described below.

LUT 410 stores thirty-two 19-bit entries. The input to LUT 410 is a 5-bit integer index i=0, 1, 2, ... 31. In response to the index i, LUT 410 produces a 19-bit signal $1/w_i$ where $w_i$ is in the interval [0.5, 1]. In some embodiments, the interval [0.5, 1] is divided into 32 equal parts, and the values $w_i$ are the end points of these parts. More particularly:

$$w_i=(32+i)/64 \quad (5)$$

LUT 410 stores the values $LUT(i)=1/w_i=64/(32+i)$. Each of these values is represented in a fixed point form in 19 bits. In some embodiments, LUT 410 stores the integer values $LUT(i)=64/(32+i)*(2^{19}-1)$. These values give better accuracy in the linear interpolation of 1/w'. LUT 410 for this embodiment is described in Appendix A below in the hardware description language Verilog®. Verilog® is described, for example, in D. E. Thomas, J. P. Moorby, "The Verilog® Hardware Description Language" (1991) hereby incorporated herein by reference. LUT 410 of Appendix A is implemented by combinational logic.

Figure 5:
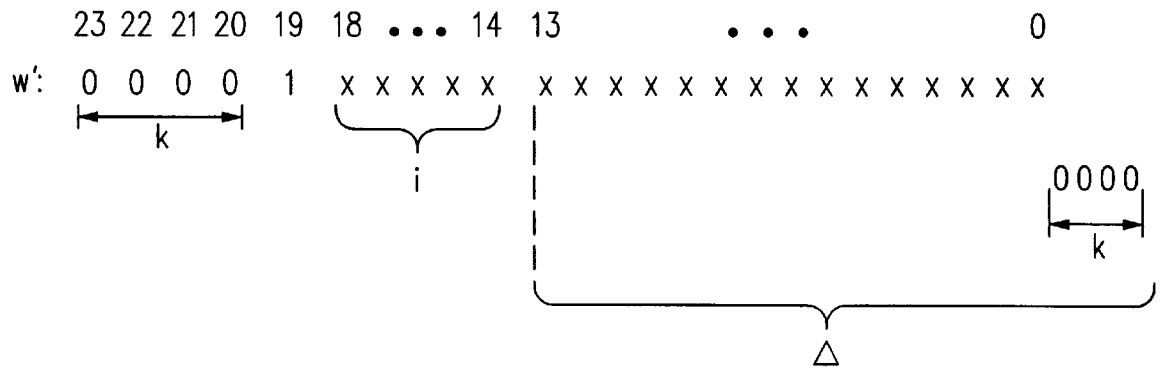
FIG. 5 illustrates bit processing by a circuit which is a portion of the circuit of FIG. 4.

Operation of normalize logic 420 is illustrated in FIG. 5. Values w' are represented in 24 bits in a fixed point form. The binary point is presumed to be before the most significant bit 23. Normalize logic 420 determines the position of the most significant "1" in w'. The normalization operation is a left shift of w' so that the most significant "1" gets into the most significant bit position 23 Normalizer 420 determines the number k of the most significant zeros in w'. This number k is provided to barrel shifter 430 (FIG. 4) to perform denormalization at the output of circuit 340. In FIG. 5, k=4 since the most significant "1" is in bit position 19.

The five bits following the most significant "1" (bits w'[18:14] in the example of FIG. 5) form the index i provided to LUT 410. The remaining less significant bits of w' (bits w'[13:0] in the example of FIG. 5) form the most significant bits of 18-bit signal Δ provided to multiplier 440 to perform linear interpolation. The remaining k bits of Δ are set to 0.

Let $w_n$ denote the normalized w', i.e. $w_n$ is w' shifted left by k bits. Thus, $w_n$ is in the interval [0.5, 1]. $w_n=w_i+\Delta_r$, where:

i is the index provided by normalize logic 420, and $w_i$ is defined by equation (5) above, and $\Delta_r=0.000000\Delta$.

Using linear interpolation, we obtain:

$$1/w_n=1/w_i+\Delta r(1/w_{i+1}-1/w_i)/(w_i-w_{i+1}) \quad (6)$$

where $w_{i+1}=1$ for i=31.

Equation (6) implies:

$$1/w_n=1/w_i-\Delta_r/(w_i w_{i+1}) \quad (7)$$

LUT 450 stores the values $1/(w_i w_{i+1})$ for each i. LUT 450 receives the index i from normalize logic 420. In some embodiments, LUT 450 is a combinational circuit. The LUT 450 output $1/(w_i w_{i+1})$ is provided to multiplier 440. Multiplier 440 also receives the signal Δ as described above. Multiplier 440 generates the signal $\Delta_r/(w_i w_{i+1})$. This signal is provided to subtractor 454. Subtractor 454 also receives the 19-bit signal $1/w_i$ from LUT 410. Subtractor 454 performs the subtraction of the equation (7) and thus generates the signal $1/w_n$. This signal is provided to multipliers 460, 464. Multiplier 460 receives u' and generates $u'*(1/w_n)$. Multiplier 464 receives v' and generates $v'*(1/w_n)$ The outputs of the two multipliers are connected to barrel shifter 430. Shifter 430 shifts $u'*(1/w_n)$ and $v'*(1/w_n)$ left by k bits and thus generates the respective texture coordinates u, v.

In some embodiments, the texture coordinates u, v are used to access the texture for a texel value. In some embodiments, the texture coordinates u, v are used to determine the "MIP map", which is a possibly pre-filtered texture. Then the texel value is provided by the MIP map, or by adjacent MIP maps. See U.S. patent application "Determining the Level of Detail for Texture Mapping in Computer Graphics", Ser. No. 08/749,859, filed by Sang-Gil Choi on Nov. 15, 1996 and hereby incorporated herein by reference.

Appendix B is a source code for a program simulating one embodiment of circuit 340. The program is written in the programming language C.

Figure 3:
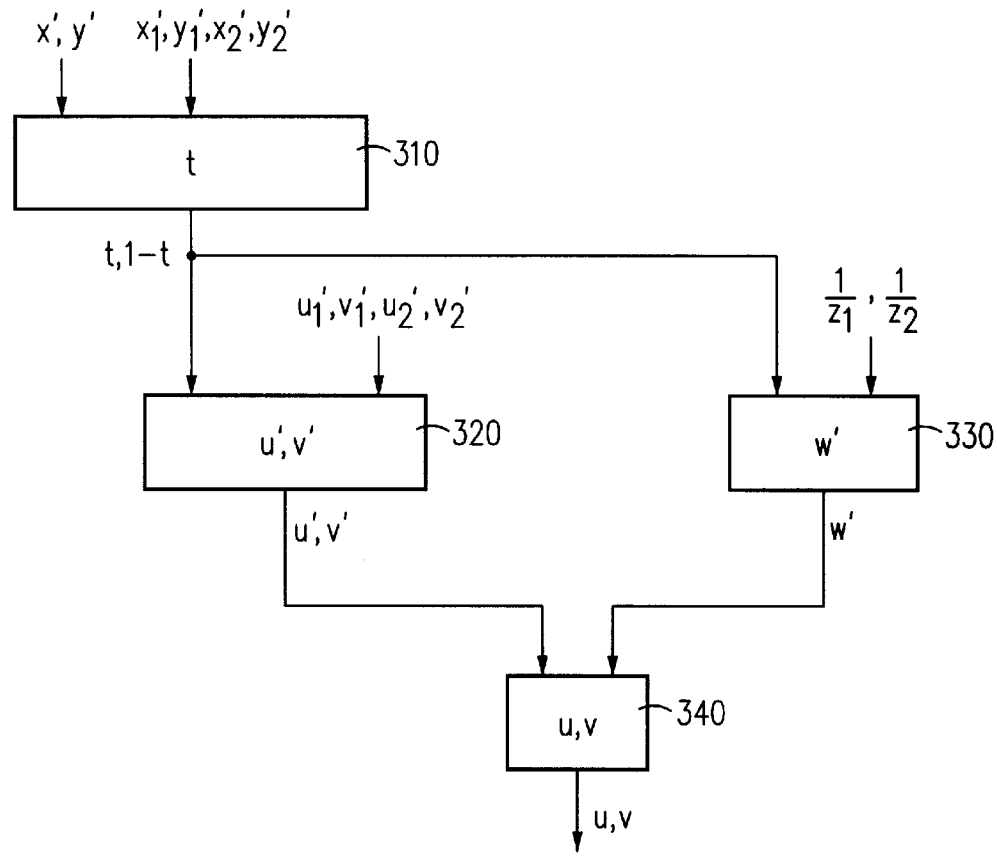
FIG. 3 is a block diagram of a circuit generating texture coordinates for the images of FIGS. 1 and 2.

Since the inputs of the circuit of FIG. 3 include modified texture coordinates $(u_1',v_1')$, $(u_2',v_2')$ of points $Q_1'$, $Q_2'$ and not the texture coordinates themselves, the texture coordinates of points $Q_1'$, $Q_2'$ need not be known. For example, in some embodiments, $Q_1'$ is a point in a segment $Q_3'$, $Q_4'$.

Points $Q_3'$, $Q_4'$ are vertices with known texture coordinates. The modified texture coordinates of $Q_1'$ are determined from the modified texture coordinates of $Q_3'$, $Q_4'$, using the linear interpolation technique of equation (2) above. The value $1/z$ is determined from the $1/z$ coordinates of points $Q_3$, $Q_4$ using the linear interpolation technique of equation (3).

The above embodiments illustrate but do not limit the invention. In particular, the invention is not limited by the number of bits in any particular signal or by the number of entries in any lookup table. The invention is defined by the appended claims.

APPENDIX A

```
/****************************************************\
// This is VerilogHDL code file for
//Look up table part of integer divider.
\****************************************************/
/* PAL for division */
module pla_lut (index, out);
    parameter DELAY = 1;      // Delay time
    input [4:0] index;
    output   [18:0] out;
    reg [18:0] out;
    always @(index)
    begin
        case(index)          // synopsys parallel_case
                    5'b00000 : # DELAY out = 19'h7ffff;
                    5'b00001 : # DELAY out = 19'h7c1f0;
                    5'b00010 : # DELAY out = 19'h78787;
                    5'b00011 : # DELAY out = 19'h75075;
                    5'b00100 : # DELAY out = 19'h71c71;
                    5'b00101 : # DELAY out = 19'h6eb3e;
                    5'b00110 : # DELAY out = 19'h6bca1;
                    5'b00111 : # DELAY out = 19'h69069;
                    5'b01000 : # DELAY out = 19'h66666;
                    5'b01001 : # DELAY out = 19'h63e70;
                    5'b01010 : # DELAY out = 19'h61861;
                    5'b01011 : # DELAY out = 19'h5f417;
                    5'b01100 : # DELAY out = 19'h5d174;
                    5'b01101 : # DELAY out = 19'h5b05b;
                    5'b01110 : # DELAY out = 19'h590b2;
                    5'b01111 : # DELAY out = 19'h57262;
                    5'b10000 : # DELAY out = 19'h55555;
                    5'b10001 : # DELAY out = 19'h53978;
                    5'b10010 : # DELAY out = 19'h51eb8;
                    5'b10011 : # DELAY out = 19'h50505;
                    5'b10100 : # DELAY out = 19'h4ec4e;
                    5'b10101 : # DELAY out = 19'h4d487;
                    5'b10110 : # DELAY out = 19'h4bda1;
                    5'b10111 : # DELAY out = 19'h4a790;
                    5'b11000 : # DELAY out = 19'h49249;
                    5'b11001 : # DELAY out = 19'h47dc1;
                    5'b11010 : # DELAY out = 19'h469ee;
                    5'b11011 : # DELAY out = 19'h456c7;
                    5'b11100 : # DELAY out = 19'h44444;
                    5'b11101 : # DELAY out = 19'h4325c;
                    5'b11110 : # DELAY out = 19'h42108;
                    5'b11111 : # DELAY out = 19'h41041;
        endcase
    end
endmodule
```

APPENDIX B

```
/***************************************************
// This is C code file
// for divider of integer. (32 entry)
***************************************************/
int LUT[33];
int global_fixed;
main()
{
        void Down_load_lut();
        int Interpolate_lut();
        float a, data;
        int i;
        int nbitsx;
        int result_div;
        int fixed_data;
        float result_data;
        int startx, endx;
        float float_fixed_data;
        long long ll_result_div;
        Down_load_lut(); /* Compose of Look-Up Table */
/* Find the number of bits effective */
        for(i=64; i<65535; i++){
        fixed_data = (int) (16777215.0 / i);
        nbitsx = Find_nbitsx(fixed_data);
        result_div = Interpolate_lut(nbitsx,
global_fixed);
        ll_result_div = (long long)result_div * (long
long)fixed_data;
        ll_result_div >>= nbitsx;
        result_div = (int)ll_result_div;
        float_fixed_data = (-16777215.0 + result_div) /
16777215.0;
        printf("Input %d :: Relative Err is %f \n", i,
float_fixed_data);
        }
}
int Interpolate_lut(nbitsx, global_fixed)
int nbitsx, global_fixed;
{
        int delta, lut1, lut2, index;
        unsigned int sublut12;
        float a;
        index = (global_fixed >> 18) & 0x1f;
        delta = global_fixed & 0x3ffff;
        lut1 = LUT[index];
        lut2 = LUT[index + 1];
        sublut12 = lut1 - lut2;
        sublut12 &= 0x3fff;
        sublut12 *= delta;
        sublut12 >>= 18;
        lut1 -= sublut12;
/**
        lut1 >>= nbitsx;
**/
        lut1 = (int)lut1;
        return(lut1);
}
int Find_nbitsx(fixed_data)
int fixed_data;
{
        int i, nbitsx;
        int tmp_fixed_data=fixed_data;
        for(i=1 ; i<= 24; i++){
                        if(tmp_fixed_data &0x1) nbitsx =i;
                        tmp_fixed_data >>= 1;
        }
        global_fixed = fixed_data << (24 - nbitsx);
        return (nbitsx-6);
}
void Down_load_lut()
{
        LUT[0]   = 0x7ffff;
        LUT[1]   = 0x7c1f0;
        LUT[2]   = 0x78787;
        LUT[3]   = 0x75075;
        LUT[4]   = 0x71c71;
        LUT[5]   = 0x6eb3e;
        LUT[6]   = 0x6bca1;
        LUT[7]   = 0x69069;
        LUT[8]   = 0x66666;
        LUT[9]   = 0x63e70;
        LUT[10]  = 0x61861;
        LUT[11]  = 0x5f417;
        LUT[12]  = 0x5d174;
        LUT[13]  = 0x5b05b;
        LUT[14]  = 0x590b2;
        LUT[15]  = 0x57262;
        LUT[16]  = 0x55555;
        LUT[17]  = 0x53978;
        LUT[18]  = 0x51eb8;
        LUT[19]  = 0x50505;
        LUT[20]  = 0x4ec4e;
        LUT[21]  = 0x4d487;
```

-continued

```
    LUT[22]  = 0x4bda1;
    LUT[23]  = 0x4a790;
    LUT[24]  = 0x49249;
    LUT[25]  = 0x47dc1;
    LUT[26]  = 0x469ee;
    LUT[27]  = 0x456c7;
    LUT[28]  = 0x44444;
    LUT[29]  = 0x4325c;
    LUT[30]  = 0x42108;
    LUT[31]  = 0x41041;
    LUT[32]  = 0x40000;
}
```

I claim:

1. A method for obtaining a texture coordinate TC1 of a point Q' to be displayed by a computer, the method comprsing:

obtaining signals representing a modified texture coordinate TC1' and a value w' such that TC1=TC1'/w';

providing the signal representing the value w' to a circuit which includes a look-up table storing inverses of selected values;

the circuit obtaining an inverse value from the look-up table and using interpolation to generate an inverse value 1/w;

the circuit multiplying the modified texture coordinate TC1' by 1/w and obtaining the texture coordinate TC1;

using the texture coordinate TC1 to obtain a texel value, and using the texel value to modify an image of the point Q', and displaying the modified image of the point Q' on a computer device which displays computer graphics images; wherein:

the point Q' is in a segment $Q_1'Q_2'$ which is an image of a segment $Q_1Q_2$, wherein $Q_1'$ is the image of a point $Q_1$ having world coordinates $(x_1,y_1,z_1)$, and $Q_2'$ is the image of a point $Q_2$ having world coordinates $(x_2,y_2,z_2)$, and wherein the point $Q_1'$ has screen coordinates $(x_1/z_1, y_1/z_1)$ and the point $Q_2'$ has screen coordinates $(x_2/z_2, y_2/z_2)$;

$w'=(1-t)/z_1+t/z_2$ wherein t is such that the point Q' has screen coordinates $(1-t)*(x_1/z_1, y_1/z_1)+t(x_2/z_2, y_2/z_2)$;

TC1 is either the u coordinate or the v coordinate of the point Q'; and

TC1' is either $(1-t)u_1/z_1+tu_2/z_2$ or $(1-t)v_1/z_1+tv_2/z_2$, wherein $(u_1,v_1)$ are texture coordinates of the point $Q_1'$ and $(u_2,v_2)$ are texture coordinates of the point $Q_2'$.

2. The method of claim 1 wherein:

the look-up table stores inverses $1/w_i$ for some values $w_i$ in a predetermined interval;

the circuit generates the index i for the look-up table such that $w_i$ approximates w'*F wherein F is a factor such that w'*F is in the predetermined interval, and the circuit provides the index i to the look-up table;

the circuit uses linear interpolation to generate the value 1/w from the output of the look-up table, wherein w=w'*F; and the circuit uses TC1' and 1/w to generate the signal TC1'*(1/(w/F)), this signal being the texture coordinate TC1.

3. The method of claim 2 wherein $F=2^k$ for some non-negative integer k, and:

to generate the signal TC1'*(1/(w/F)), the circuit shifts the product TC1'*(1/w) by k bits.

4. The method of claim 1 further comprising:

the circuit generating the value t from the screen coordinates of the points $Q_1'$, $Q_2'$, Q';

the circuit generating the values $(1-t)u_1/z_1+tu_2/z_2$ and $(1-t)v_1/z_1+tv_2/z_2$ from t, $u_1/z_1$, $u_2/z_2$, $v_1/z_1$, $v_2/z_2$;

the circuit generating w' from t, $1/z_1$ and $1/z_2$;

the circuit generating the texture coordinates TC1=u and TC1=v; and using the texture coordinates (u,v) to obtain a texel value, and using the texel value to display the point Q'.

5. The method of claim 1 wherein obtaining signals representing TC1' and w' comprises:

a first circuit receiving signals representing the screen coordinates of the points Q', $Q_1'$, $Q_2'$ and generating signals representing the values t and 1−t;

a second circuit receiving the signals representing t and 1−t from the first circuit and also receiving a signal representing at least one of the following pairs of values:

(1) $u_1/z_1$ and $u_2/z_2$;

(2) $v_1/z_1$ and $v_2/z_2$, and generating said modified texture coordinate TC1';

a third circuit receiving the signals representing t, 1−t from the first circuit and also receiving signals representing the values $1/z_1$, $1/z_2$, and generating the value w'; and a circuit receiving the signal representing TC1' from the second circuit and the signal representing w' from the third circuit and generating a signal representing TC1.

6. The method of claim 1 further comprising:

obtaining a signal representing a modified texture coordinate TC2' such that TC2=TC2'/w' and TC2 is a texture coordinate of the point Q';

multiplying the modified texture coordinate TC2' by 1/w and obtaining the texture coordinate TC2; and using the texture coordinate TC2 to obtain said texel value.

7. A system for obtaining a texture coordinate TC1 of a point Q' to be displayed by a computer, the system comprising:

a terminal for receiving signals representing a modified texture coordinate TC1' and a value w' such that TC1=TC1'/w';

a circuit connected to the terminal, for receiving the signal representing the value w', the circuit comprising a look-up table storing inverses of selected values, the circuit being for obtaining an inverse value from the look-up table and for using interpolation to generate an inverse value 1/w, and for multiplying the modified texture coordinate TC1' by 1/w and obtaining the texture coordinate TC1, wherein:

the point Q' is in a segment $Q_1'Q_2'$ which is an image of a segment $Q_1Q_2$, wherein $Q_1'$ is the image of a point $Q_1$ having world coordinates $(x_1, y_1, z_1)$, and $Q_2'$ is the image of a point $Q_2$ having world coordinates $(x_2, y_2, z_2)$, and wherein the point $Q_1'$ has screen coordinates $(x1/z_1, y_1/z_1)$ and the point $Q_2'$ has screen coordinates $(x_2/z_2, y_2/z_2)$;

$w'=(1-t)/z_1+t/z_2$ wherein t is such that the point Q' has screen coordinates $(1-t)*(x_1/z_1, y_1/z_1)+t(x_2/z_2, y_2/z_2)$;

TC1 is either the u coordinate or the v coordinate of the point Q'; and

TC1' is either $(1-t)u_1/z_1+tu_2/z_2$ or $(1-t)v_1z_1+tv_2/z_2$, wherein $(u_1,v_1)$ are texture coordinates of the point $Q_1'$ and $(u_2,v_2)$ are texture coordinates of the point $Q_2'$.

8. The system of claim 7 wherein:

the look-up table stores inverses $1/w_i$ for some values $w_i$ in a predetermined interval;

the circuit comprises circuitry for generating the index i for the look-up table such that $w_i$ approximates $w'*F$ wherein F is a factor such that $w'*F$ is in the predetermined interval;

the circuit being for using linear interpolation to generate the value 1/w from the output of the look-up table, wherein $w=w'*F$, and the circuit being for using TC1' and 1/w to generate the signal TC1'*(1/(w/F)), this signal being the texture coordinate TC1.

9. The system of claim 8 wherein $F=2_k$ for some non-negative integer k, and:

the circuit includes a shifter for shifting the product TC1'*(1/w) by k bits to generate the signal TC1'*(1(w/F)).

10. The system of claim 7 wherein the circuit further comprises:

circuitry for generating the value t from the screen coordinates of the points $Q_1'$, $Q_2'$, $Q'$;

circuitry for generating the values $(1-t)u_1/z_1+tu_2/z_2$ and $(1-t)v_1/z_1+tv_2/z_2$ from t, $u_1/z_1$, $u_2/z_2$, $v_1/z_1$, $v_2/z_2$;

circuitry for generating w' from t, $1/z_1$ and $1/z_2$;

circuitry for generating the texture coordinates TC1=u and TC1=v; and circuitry for receiving the texture coordinates (u, v), obtaining a texel value, and for using the texel value to display the point Q'.

11. The system of claim 7 wherein said circuit is also for receiving a signal representing a modified texture coordinate TC2' such that TC2=TC2'/w', wherein TC2is a texture coordinate of the point Q', and for rrultiplying the modified texture coordinate TC2' by 1/w and obtaining the texture coordinate TC2, wherein TC2' is either $(1-t)u_1/z_1+tu_2/z_2$ or $(1-t)v_1/z_1+tv_2/z_2$.

12. A system for obtaining a texture coordinate TC1 of a point Q' to be displayed by a computer, wherein TC1=TC1'/w', wherein TC1 is a modified texture coordinate, the system comprising:

a first lookup table storing inverse values $1/w_i$ of selected values $w_i$ which are in a a normalizer for receiving the signal w' and generating an index i for the first lookup table to obtain the signal 1/w wherein w is in the predetermined interval and $w=w'*F$ for some factor F;

an interpolation circuit for receiving the signal $1/w_i$ from the lookup table, performing an interpolation, and generating the signal 1/w; and a result generation circuit for generating the texture coordinate TC1 from TC1' and 1/w, wherein the interpolation circuit comprises:

a second lookup table for storing the values $1(w_iw_{i+1})$ and providing one of these values in response to the index i;

a multiplier for receiving the value $1/(w_iw_{i+1})$ and for receiving from the normalizer a signal representative of the value $(w-w_i)$ and for generating a signal representative of the product $(w-w_i)*\{1/(w_iw_{i+1})\}$; and a subtractor for subtracting the mulliplier output from the output $1/w_i$ of the first lookup table and thus generating the signal 1/w.

13. The system of claim 12 wherein the result generation circuit comprises:

a multiplier for generating the product TC1'*(1/w); and a shifter for shifting the multiplier output by k bits wherein $k=\log_2 F$.

14. A method for generating an image of one or more objects by a computer graphics system, the one or more objects irrluding points $Q_1$ and $Q_2$ and a point Q in a segment $Q_1Q_2$, wherein the point $Q_1$ has world coordinates $(x_1, y_1, z_1)$, the point $Q_2$ has world coordinates $(x_2, y_2, z_2)$, and the point Q has world coordinates (x, y, z), the method comprising:

obtaining first signals representing screen coordinates $(x_1', y_1')=(x_1/z_1, y_1/z_1)$ corresponding to the point $Q_1$, screen coordinates $(x_2', y_2')=(x_2/z_2, y_2/z_2)$ corresponding to the point $Q_2$, and screen coordinates $(x', y')=(x/z, y/z)$ corresponding to the point Q;

using the first signals to generate a second signal representing at least one of values t, 1-t such that:

$(x', y')=(1-t)*(x_1', y_1')+t(x_2', y_2')$ obtaining third signals representing modified texture coordinates $TC1'=TC1_1/z_1$, $TC1_2'=TC1_2/z_2$, wherein $TC_{11}$ is a texture coordinate of the point $Q_1$, and $TC1_2$ is a texture coordinate of the point $Q_2$;

using the second and third signals to generate a fourth signal representing a value $TC1'=(1-t)*TC1_1'+t*TC1_2'$;

obtaining fifth signals representing $1/z_1$ and $1/z_2$;

using the second and fifth signals to generate a sixth signal representing a value $w'=(1-t)/z_1+t/z_2$;

using the fourth and sixth signals to generate a signal representing a value TC1=TC1'/w';

using TC1 as a texture coordinate of the point Q to determine a texture corresponding to the point Q, and modifying an image of the point Q with said texture, and displaying the modified image of the point Q on a computer device.

15. The method of claim 14 wherein:

the second signal is generated by a first circuit;

the fourth signal is generated by a second circuit having an input connected to an output of the second circuit;

the sixth signal is generated by a third circuit having an input connected to said output of the first circuit; and the signal representing TC1 is generated by a fourth circuit having inputs connected to the outputs of the second and third circuits.

16. The method of claim 14 further comprising:

obtaining signals representing modified texture coordinates $TC2_1'=TC2_1/z_1$, $TC2_2'=TC2_2/z_2$, wherein $TC2_1$ is a texture coordinate of the point $Q_1$, and $TC2_2$ is a texture coordinate of the point $Q_2$;

using the signals representing $TC2_1'$, $TC2_2'$, and the second signals, to generate a signal representing a value $TC2'=(1-t)*TC2_1'+t*TC2_2'$;

using the signal representing TC2' and the sixth signal representing W' to generate a signal representing a value TC2=TC2'/w'; and using TC2 as a texture coordinate Of the point Q to determine said texture corresponding to the point Q.

17. A computer graphics system comprising:

a first circuit for receiving screen coordinates $(x_1', y_1')=(x_1/z_1, y_1/z_1)$ of a point $Q_1'$, screen coordinates $(x_2',$ $y_2') = (x_2/z_2, y_2/z_2)$ of a point $Q_2'$, and screen coordinates $(x', y')$ of a point $Q'$ in a segment $Q_1'Q_2'$, wherein $(x_1, y_1, z_1)$ are world coordinates of a point $Q_1$ and $(x_2, y_2, z_2)$ are world coordinates of a point $Q_2$, the first circuit being for generating a signal representing at least one of values $t$, $1-t$ such that:

$$(x',y') = (1-t)(x_1', y_1') + t(x_2', y_2');$$

a second circuit for receiving: (1) the signal representing at least one of $t$, $1-t$ from the first circuit; and (2) signals representing Modified texture coordinates $TC1_1'$, $TC1_2'$ of respective points $Q_1$, $Q_2$, wherein $TC1_1' = TC1_1/z_1$, $TC1_2' = TC1_2/z_2$, and $TC1_1$ and $TC1_2$ are texture coordinates of respective points $Q_1$, $Q_2$, the second circuit being for generating a signal representing $TC1' = (1-t)*TC1_1' + t*TC1_2'$;

a third circuit for receiving: (1) the signal representing that least one of $t$, $1-t$ from the first circuit, and (2) signals representing $1/z_1$, $1/z_2$, and for generating a signal representing $w' = (1-t)/z_1 + t/z_2$; and a fourth circuit for receiving: (1) the signal representing $TC1'$ from the second circuit, and (2) the signal representing $w'$ from the third circuit, and for generating a signal representing a value $TC1 = TC1'/w'$, and using the value $TC1$ as a texture coordinate to obtain a texture to modify an image at the point $Q'$.

18. The system of claim 17 wherein:

the second circuit is also for receiving signals representing modified texture coordinates $TC2_1'$, $TC2_2'$ of respective points $Q_1$, $Q_2$, wherein $TC2_1' = TC2_1/z_1$, $TC2_2' = TC2_2/z_2$, and $TC2_1$ and $TC2_2$ are texture coordinates of respective points $Q_1$, $Q_2$, the second circuit being also for generating a signal representing $TC2' = (1-t)*TC2_1' + t*TC2_2'$; and the fourth circuit is also for receiving the signal representing $TC2'$ from the second circuit and for generating a signal representing a value $TC2 = TC2'/w'$, and using the value $TC2$ as a texture coordinate to obtain said texture to modify the image at the point $Q'$.

* * * * *